(12) United States Patent
Yu

(10) Patent No.: US 7,330,100 B2
(45) Date of Patent: Feb. 12, 2008

(54) MOBILE DEVICE AND RELATED METHOD FOR DISPLAYING TEXT MESSAGE WITH BACKGROUND IMAGES

(75) Inventor: Hsin-Hsien Yu, Kao-Hsiung Hsien (TW)

(73) Assignee: BenQ Corporation, Gueishan, Tao-Yuan Hsien (TW)

( * ) Notice: Subject to any disclaimer, the term of this patent is extended or adjusted under 35 U.S.C. 154(b) by 424 days.

(21) Appl. No.: 10/904,132

(22) Filed: Oct. 26, 2004

(65) Prior Publication Data
US 2005/0097463 A1 May 5, 2005

(30) Foreign Application Priority Data
Oct. 31, 2003 (TW) .............................. 92130569 A

(51) Int. Cl.
*H04Q 9/00* (2006.01)
*G06F 17/00* (2006.01)
*G09G 5/00* (2006.01)
*H04M 1/64* (2006.01)

(52) U.S. Cl. ..................... 340/5.61; 345/636; 715/531; 715/501.1; 379/88.11

(58) Field of Classification Search ............... 340/5.61; 715/531, 501; 345/636; 379/88.11
See application file for complete search history.

(56) References Cited

U.S. PATENT DOCUMENTS 5,073,927 A * 12/1991 Grube ..................... 348/14.01
5,784,001 A * 7/1998 Deluca et al. ............. 340/7.56
6,044,248 A * 3/2000 Mochizuki et al. ........ 340/7.47
6,044,250 A * 3/2000 Kuramatsu et al. .......... 340/7.4
6,445,396 B1 * 9/2002 Suzuki ....................... 345/636
6,993,553 B2 * 1/2006 Kaneko et al. ............. 709/201
2004/0021555 A1 * 2/2004 Faris ......................... 340/7.52

FOREIGN PATENT DOCUMENTS

CN 1347260 A 5/2002

* cited by examiner

Primary Examiner—Brian Zimmerman
Assistant Examiner—Scott Au
(74) Attorney, Agent, or Firm—Winston Hsu

(57) ABSTRACT

A wireless communications device includes a communication circuit for receiving a message signal having a text message via radio transmission; a storage device having a plurality of image data stored therein; a selecting module for selecting an image datum from the plurality of image data; a combining module for combining the selected image datum with the text message to generate combined data; and a display panel for displaying the combined data. If the selected image datum indicates a predefined text display area, the combining module positions the text message in the predefined text display area of the selected image datum.

27 Claims, 10 Drawing Sheets

MOBILE DEVICE AND RELATED METHOD FOR DISPLAYING TEXT MESSAGE WITH BACKGROUND IMAGES

BACKGROUND OF INVENTION

1. Field of the Invention

The present invention relates to mobile devices and more specifically to mobile devices with means for displaying text messages with background images.

2. Description of the Prior Art

Due to the prosperity and continued development of wireless communication networks in today's modern information society, mobile devices, such as mobile phones, have become one of the most popular communication tools. Therefore, information manufacturers are actively making great efforts in the development of mobile technology to provide increased adjustment flexibility, fitness to different user preferences and requirements, and enjoyment of use while striving for a closer relationship between these hi-tech instruments and everyday life.

As is known to those of ordinary skill in the art, modern mobile phones not only allow access to voice messages but also allow text messages to be transmitted via the wireless communication network using methods such as short message service (SMS). Using services such as SMS, a user sends a text message using a first mobile phone to another user who receives the message on a second mobile phone. In some cases, such as when passing important but hard-to-memorize messages, transmitting text messages with SMS is actually more convenient than leaving a voice message. However, the prior art systems only display the text received in an SMS message in a simple and static way. Please refer to FIG. 1, which illustrates a display panel 12 of a prior art mobile phone 10 when displaying a text message.

As shown in FIG. 1, the prior art mobile phone 10 displays only the content of the text message on the display panel 12. For example, if the mobile phone 10 receives a text message of 'How are you today?' via the wireless communication network, the prior art mobile phone 10 displays the message by simply displaying the text on the display panel 12. This fixed method of display means that the prior art mobile phones only have static presentation of text messages. There are no features available to provide personality, friendliness, or an easy-to-use interface.

SUMMARY OF INVENTION

It is therefore an objective of the claimed invention to provide a wireless communications device capable of displaying text within a text display area of a selected image on a display panel of the wireless communications device.

According to an exemplary embodiment of the claimed invention, a wireless communications device is disclosed comprising: a communication circuit for receiving a message signal having a text message via radio transmission; a storage device having a plurality of image data stored therein; a selecting module for selecting an image datum from the plurality of image data; a combining module for combining the selected image datum with the text message to generate combined data, wherein if the selected image datum indicates a predefined text display area, the combining module positions the text message in the predefined text display area of the selected image datum; and a display panel for displaying the combined data.

According to another exemplary embodiment of the claimed invention, a method of displaying a text message on a wireless communications device is disclosed. The method comprises storing a plurality of image data; receiving a message signal having the text message via radio transmission; selecting an image datum from the plurality of image data; combining the selected image datum with the text message to generate combined data, wherein if the selected image datum indicates a predefined text display area, positioning the text message in the predefined text display area of the selected image datum; and displaying the combined data on a display panel of the wireless communications device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
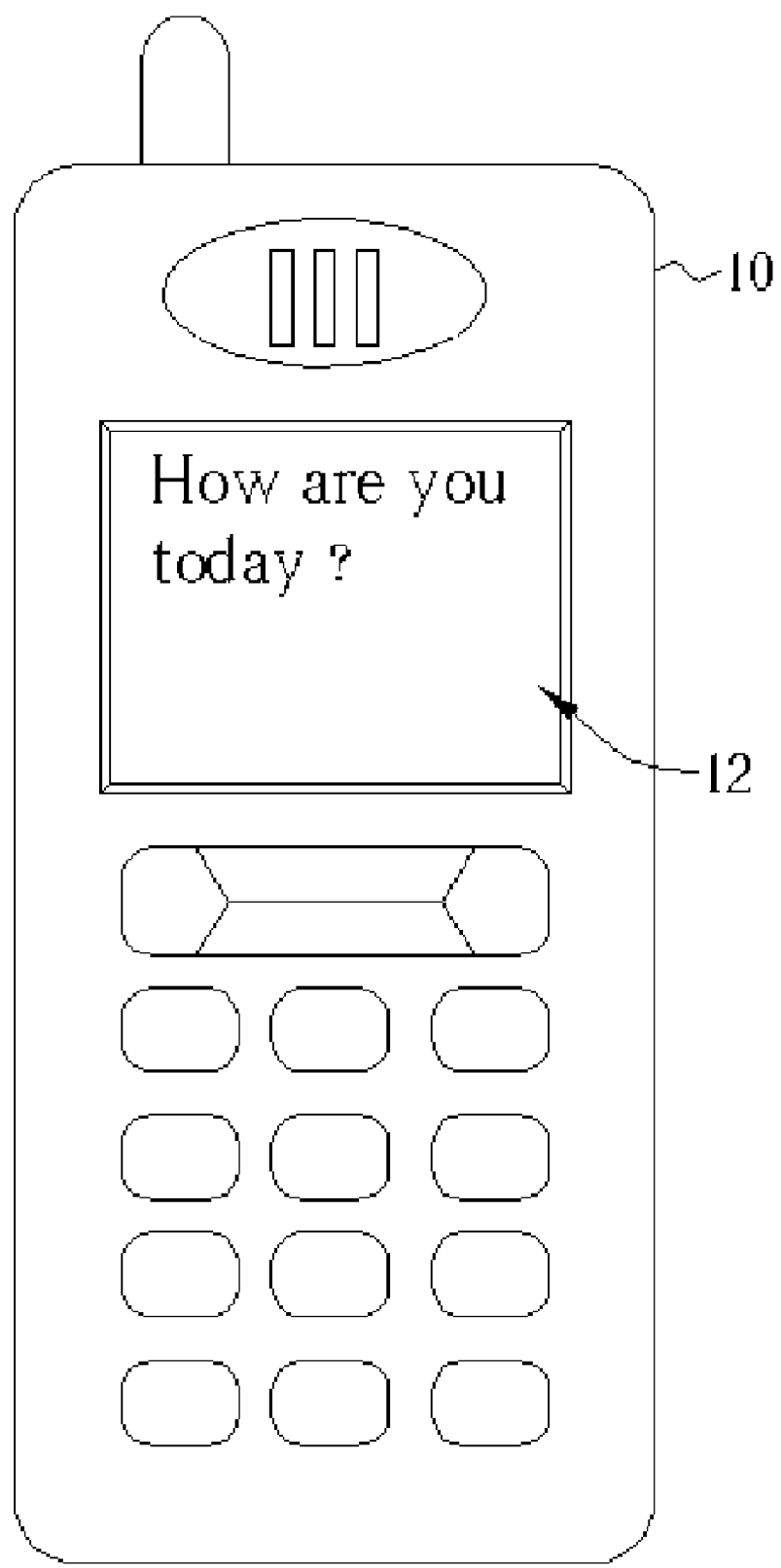
FIG. 1 is a display panel of a prior art mobile phone when displaying a text message.
Figure 2:
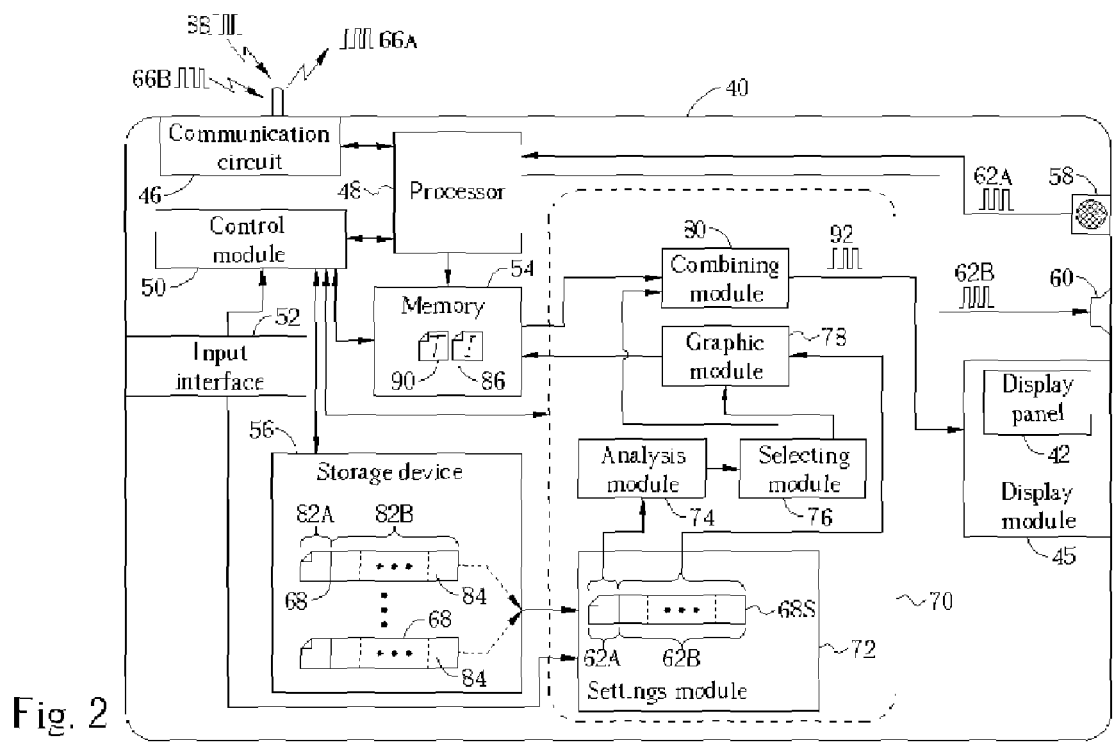
FIG. 2 is a block diagram of a wireless communication device according to an exemplary embodiment of the present invention.

Please refer to FIG. 2. FIG. 2 shows a block diagram of a wireless communication device 40 according to the present invention. For example, the wireless communication device 40 is a mobile phone 40 having a display panel 42 such as a liquid crystal display (LCD), a display module 45, a communication circuit 46 such as an antenna circuit, a processor 48, a control module 50, an input interface 52, a memory 54 such as a non-volatile random access memory (RAM), a storage device 56, a microphone 58, and a speaker 60. In order to implement a changeable background feature of the present invention, the mobile phone 40 further includes a text message display module 70. Text messages are processed by the text message display module 70 and are then displayed on the display panel 42. In one embodiment, the storage device 56 is implemented using a non-volatile storage means to store data.

When the user of the mobile phone 40 performs wireless voice communications, the user's voice is received by the microphone 58 and is converted to an electrical signal 62A. The processor 48 uses the communication circuit 46 to encode and modulate the electrical signal 62A and thereby transmits audio signal 66A to the wireless network. When the mobile phone 40 receives an audio signal 66B corresponding to a remote user's voice, the communication circuit 46 passes the received signal 66B to the processor for decoding and demodulation. Afterwards the received signal 66B becomes an audio signal 62B, which is played by the speaker 60. Similarly, when performing text message operations, transmitted wireless SMS message signals are received via the communication circuit 46. The message signals are demodulated and decoded to recover received text message content. Text message data 90 corresponding to the received text message content is stored in the memory 54.

In an exemplary embodiment of the present invention, in order to match different backgrounds with the text message content, the text message display module 70 includes a settings module 72, an analysis module 74, a selecting module 76, a graphic module 78, and a combining module 80. Furthermore, stored within the storage device 56 is at least one theme file 68. Each theme file 68 follows a format having a head 82A and a content body 82B. The body 82B stores one or a plurality of original image data 84. For example, FIG. 2 shows a plurality of theme files 68, and each theme file 68 has a plurality of original image data. The original image data correspond to background images while displaying text messages on the display panel 42. It should be noted that in a preferred embodiment of the present invention, the original image data are stored in a compressed form and are decompressed before usage to provide the corresponding background images. Furthermore, the header 82A of each theme file 68 is used to record information corresponding to each original image data. For example, the information can include fields such as an access address, a file size, and position for a text display area to display text characters. Further explanation of these fields is provided later in this description.

Using the series of image data stored in each theme file 68, the text message display module 70 of the present invention is able to match the text messages with different background images. User settings are stored in the mobile phone 40 to indicate whether or not the user wishes to utilize the multiple background image function of the present invention. When the mobile phone 40 is configured to utilize the multiple background image function of the present invention, a particular theme file 68S is first selected if there is a plurality of theme files 68. For example, the particular theme file 68S could be selected according to a user setting stored in the settings module 72 or other methods explained later. The analysis module 74 is notified of the particular theme file 68S that was selected. (as indicated on FIG. 2). After the settings module 72 selects theme file 68S according to predetermined user settings, the analysis module 74 parses the header 62A of the theme file 68S to obtain information indicating the number of original image data 84 stored in the theme file 68S and information regarding the original image data 84. Next, the selecting module 76 selects an original image datum from the particular theme file 68S to be used as a background image. Afterwards, the selected image data 86 is stored within the memory 54. As mentioned above, it may be required to first decompress the selected image data 86 before storing it in the memory 54.

When a text message is to be displayed, the text message 90 is first stored in the memory 54. After the graphic module 78 has outputted processed image data, both the selected image datum 86 and the text message 90 are stored in the memory 54. The text message module 70 is therefore combine the text message 90 and the selected image datum 86 to form combined data 92, which is displayed on the display panel 42. As seen by the user, the selected image datum 86 acts as a background image for the text message. According to the present invention, in order to increase user enjoyment when viewing messages, different image backgrounds can have different text display areas. In other words, the characters of the text message are displayed in different positions on different background images. After the selecting module 76 chooses an image datum from the particular theme file 68S to be the image background, information corresponding to the text display area of the selected image datum 86 is transmitted to the combining unit 80. This information allows the combining unit 80 to put characters of the text message 90 in the proper text display area of the selected image datum 86. In order to further explain how different image data can have different text display areas according to the present invention, please refer to FIG. 3.

Figure 3:
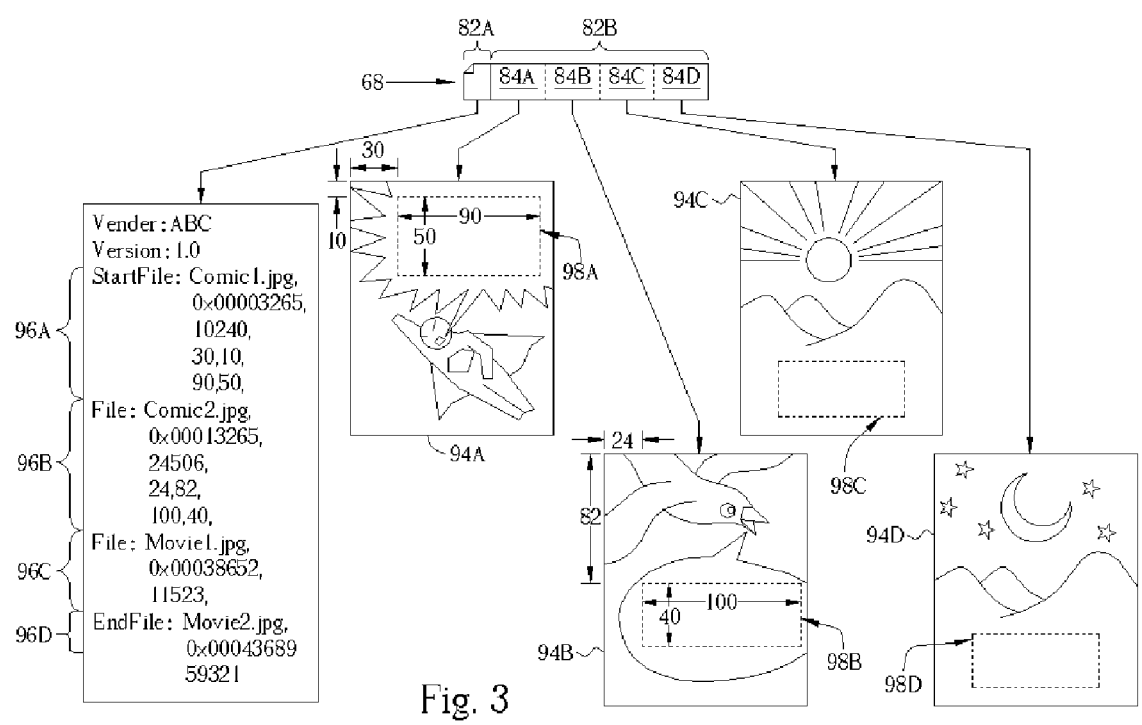
FIG. 3 is a diagram showing the format of a theme file according to an exemplary embodiment of the present invention.

As shown in FIG. 3, each theme file 68 has a header 82A and a body 82B. FIG. 3 shows a format of a theme file 68 according to an exemplary embodiment of the present invention. For convenience of explanation, the theme file 68 shown in FIG. 3 is divided into four original image data corresponding to four background images, respectively. More specifically, the theme file 68 shown in FIG. 3 includes original image data 84A, 84B, 84C, and 84D, which correspond to background images 94A, 94B, 94C, and 94D, respectively. As shown in FIG. 3, the header 82A stores a vender name (e.g., Vender: ABC), a file version (Version: 1.0), etc. More importantly, the header 82A contains four sections: 96A to 96D. The sections 96A to 96D correspond to the original image data 84A to 84D, respectively, and record information related to the respective original image data.

Firstly, section 96A uses "StartFile: Comic1 .jpg" to indicate that the name of the first section is "Comic1 .jpg" and that this is the first file in the theme file 68. The parameter "0x00003265" indicates the starting address of original image datum 84A within the theme file 68. The parameter "10240" indicates the size of the original image datum 84A. In this way, if the selecting module 76 selects original image datum 84A as the background image, the graphic module 78 is able to perform operations according to the above described parameters. For example, the graphic module 78 performs decompression to generate a corresponding image file, which is used to display the background image 94A on the display panel 42. In other words, background image 94A corresponds to original image datum 84A, as shown in FIG. 3.

As mentioned above, according to the present invention, background images can have a text display area used to display characters. Furthermore, different background images can have different text display areas. In one embodiment, information concerning the different text display areas of the original image data 84A, 84B, 84C, 84D is stored in the header 82A of the theme file 68. As shown in FIG. 3, background image 94A has a defined text display area 98A having an origin at (30, 10), a width of 90, and a height of 50. Many implementation methods to define the text display area for the image data 84A, 84B, 84C, 84D can be used with the present invention. For example, in the embodiment shown in FIG. 3, the parameter "30" indicates the text display area is a distance of 30 units from the left edge of the background image 94A. The parameter "10" indicates the text display area is a distance of 10 units from the top edge of the background image 94A. The parameter "90, 50" indicates the respective width and height of the text display area. The distance unit can be defined differently, such as character numbers. In this way, if the selecting module 76 selects background image 94A (image datum 84A) to be the background image for a received text message, the combining module 80 positions the characters of the text message in the proper text display area 98A according to information stored in the theme file 68.

Similarly, according to the same parameter order, in header 82A shown in FIG. 3, information is also stored corresponding to background image 94B. Firstly, section 96B uses "File: Comic2.jpg" to indicate that the name of section 96B is "Comic2.jpg" and that this file is the second one in the theme file 68. The parameter stored in the header 82A for this file also indicate the starting address, the datum size and the position of text display area, etc. According to the present invention, because each background image can have a different text display area, this allows an effect similar to dialog boxes that are used in comic books. These dialog boxes often change positions over various pages. In other words, by using different text display areas for different background images, the present invention displays text messages with a style and layout similar to that of comic books.

As shown in FIG. 3, the header 82A also contains a section 96C for recording information corresponding to original image data set 84C. Similar to the above description, section 94D stores "File: Movie1 .jpg" to indicate that the name of original image data set 96C is "Movie1.jpg" and that this file is neither the first nor the last in the theme file 68. The parameter "0x00038652" indicates the starting address of original image data set 84C within the theme file 68. The parameter "11523" indicates the size of original image data set 84C. In contrast to the above description of using the comic book style layout, the present invention can also position text on background images without a predetermined text display area. In this example, the combining module 80 positions characters of the received text message in a default position of the display. As the example in FIG. 3 shows, because original image datum 84C does not have a predetermined text display area, section 96C does not need to record parameters corresponding to text display area. If the selection module 76 selects original image datum 84C as the background image, the combining module 80 will discover that there is no predetermined text display area recorded in section 96C. Therefore, the combining module 80 positions the characters of the received text message within the default position of the display for the mobile phone 40. The default position of the display, for example, is at the middle of the background image or a lower area of the background image, etc.

Similarly, as shown in FIG. 3, assume the last original image datum 84D does not have a predefined text display area in the theme file 86. Therefore, the information stored in the header 82A corresponding to original image datum 84D will not include parameter corresponding to a text display area. Concerning the information that is stored in the header 82A, because this data set is the last data set of the theme file 68, section 94D uses "EndFile: Movie2.jpg" to indicate that the name of original image datum 96D is "Movie2.jpg" and that this is the last file in the theme file 68. If the selecting module 76 shown in FIG. 2 selects the original datum 84D to be background image, the combining module 80 uses a combining method similar to the above-mention method for original datum 84C. The characters of the text message 90 will be displayed in the display area of mobile phone 40 as shown in the box indicated with a dotted line in frame 94D of FIG. 3. In other words, when the mobile phone 40 of the present invention receives a text message, the characters of the text message will be in the same position. The default position is similar to a subtitle area used in movies. Movie subtitles are usually shown in a fixed area that remains at the same position on each frame to display subtitles. In other words, for background images without a predefined text display area, the text message is placed in the default position of display; therefore, the present invention is capable of displaying text messages with a style and layout similar to that of subtitles in a movie.

Figure 4:
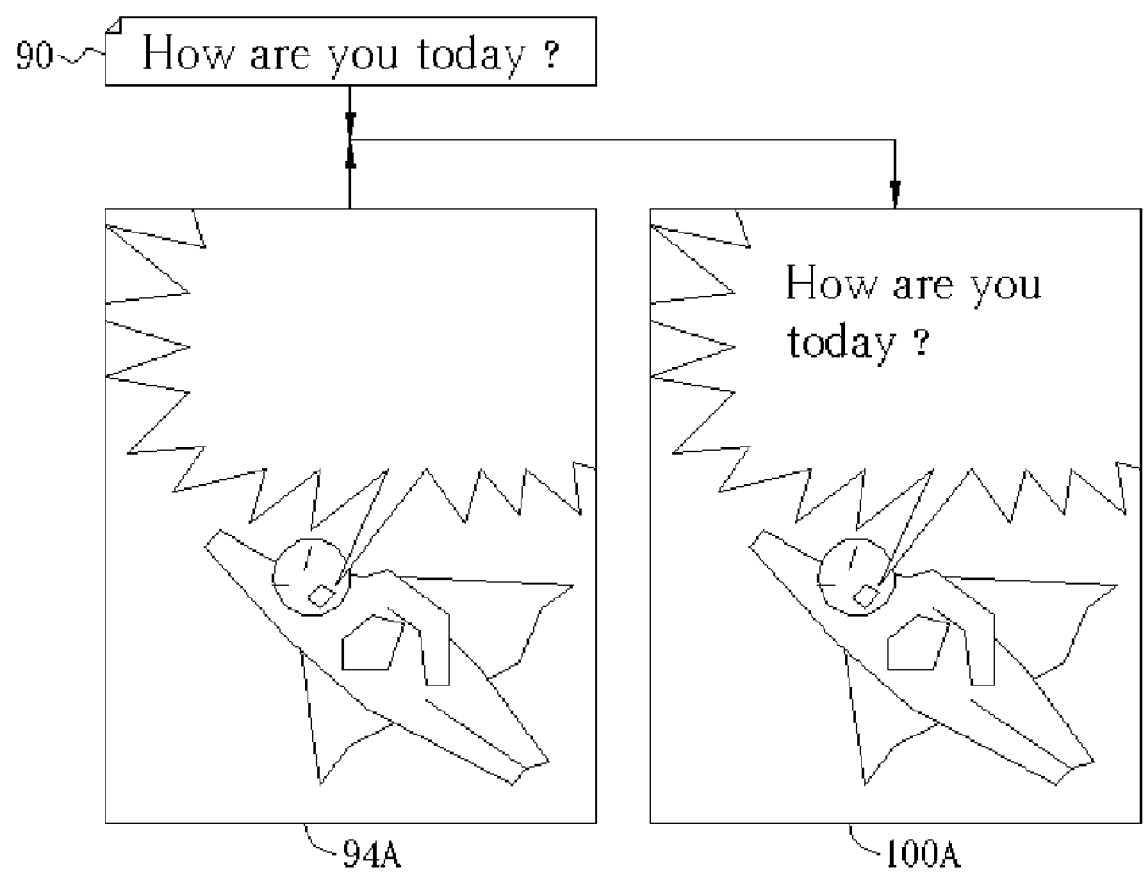
FIG. 4 to FIG. 7 are image frames being used as a background image for an example text message on the mobile phone of FIG. 2.
Figure 5:
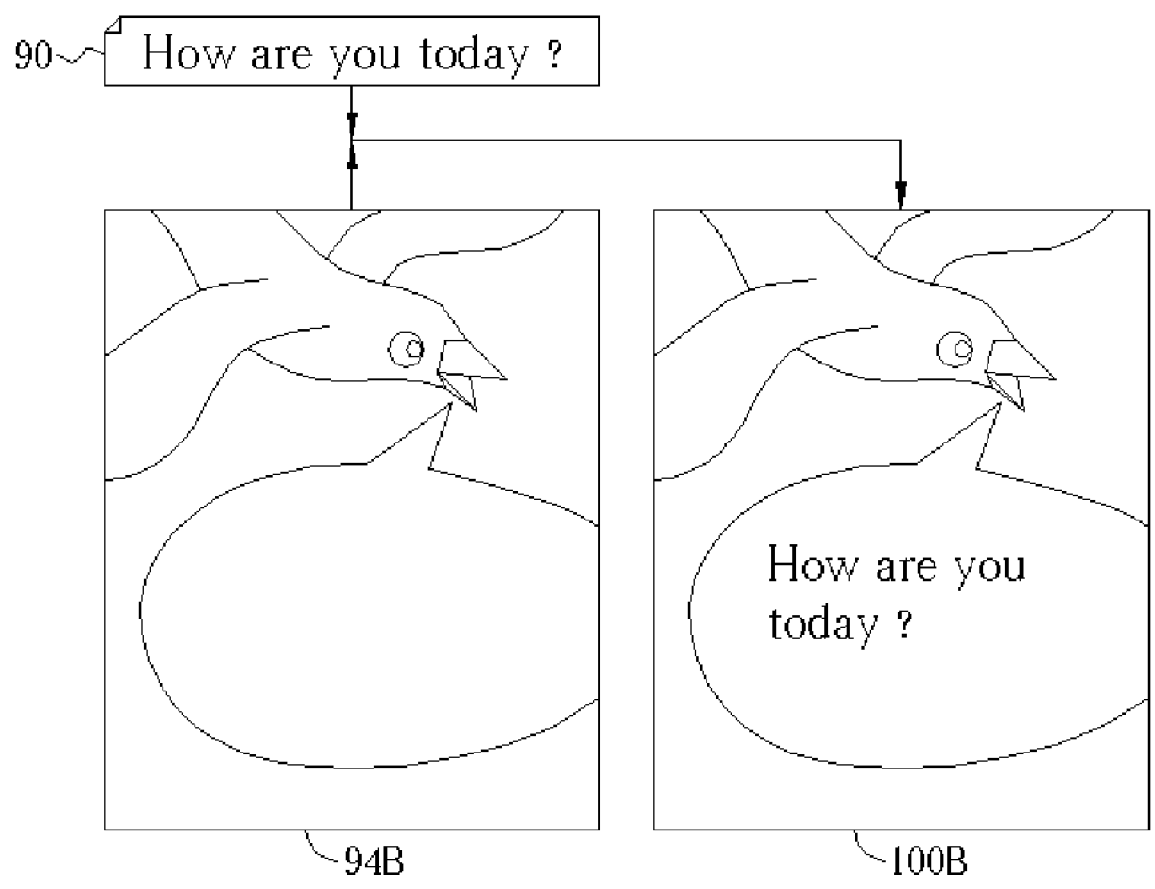
Figure 6:
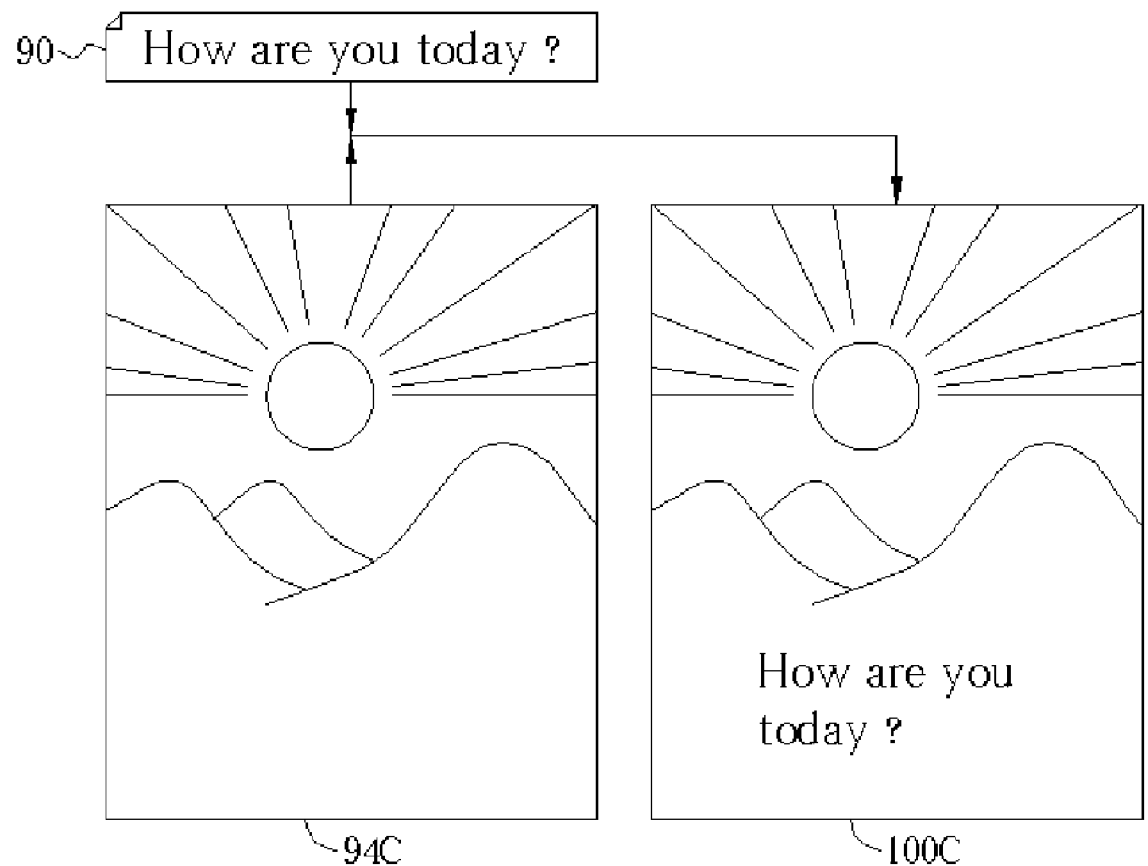
Figure 7:
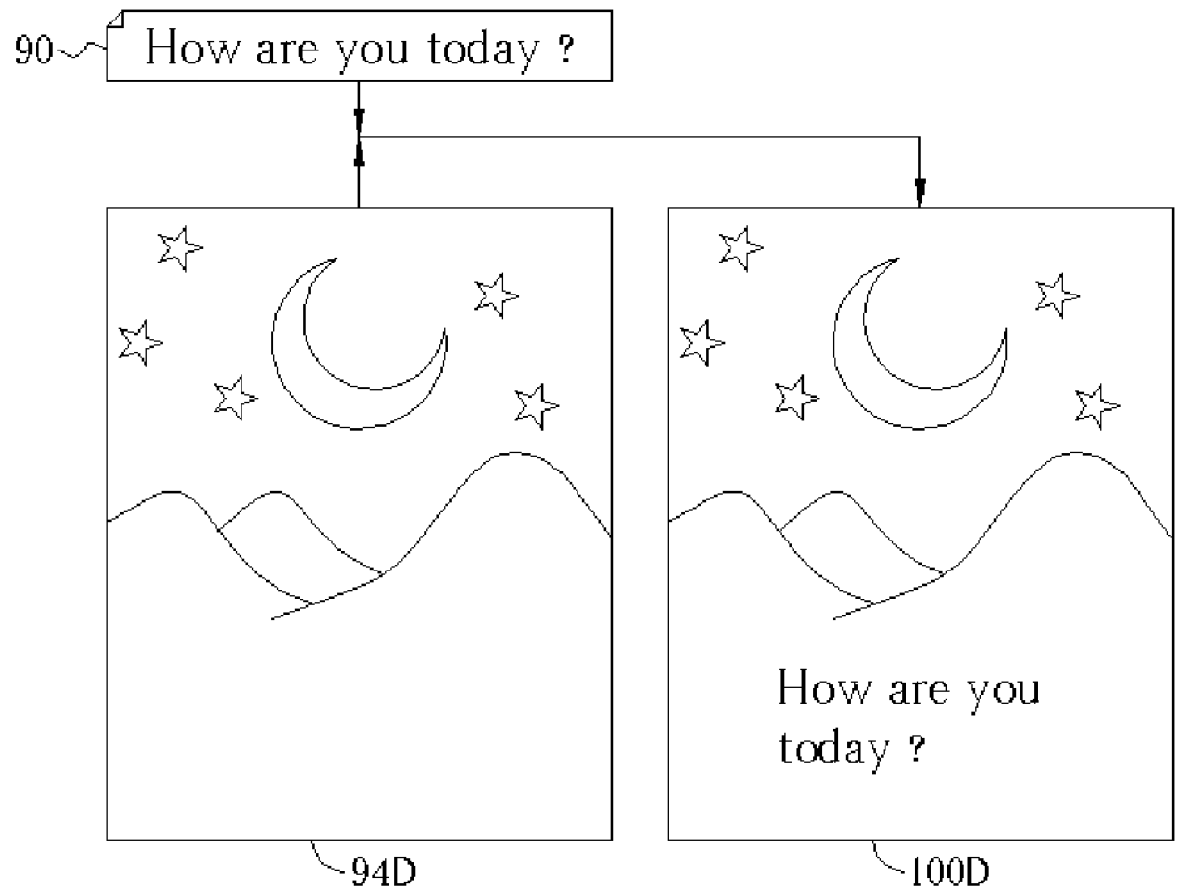

Please refer to FIG. 4 to FIG. 7. FIG. 4 to FIG. 7 show background images 94A to 94D, respectively. They are used as the background images for text messages on the mobile phone 40 according to the present invention. In FIG. 4 to FIG. 7, the example text message is "How are you today?". As shown in FIG. 4, if the selecting module 76 selects image datum 84A in FIG. 3 as the background image 94A, the combining unit 80 combines the text message 90 with the image datum 94A to form combined image data 100A, which is then displayed on the display panel 42. Specifically, the text message 90 is positioned in the text display area 98A shown in FIG. 3 of the image datum 94A to allow a comic book style presentation of the text message. Similarly, as shown in FIG. 5, if the background image 94B corresponding to image datum 84B shown in FIG. 3 is selected, combined image data 100B is displayed on the display panel 42. However, if background images 94C or 94D are selected as the background image, the combining unit 80 positions the text message in a default position of the display because these two image data do not have corresponding predetermined text display areas. Similar to subtitles in a movie, positioning the text message in the default position results in combined image data 100C and 100D shown in FIG. 6 and FIG. 7, respectively.

As can be seen from the above-mentioned description, according to the present invention, because of the coordination between the header and the content of each theme file 68 and the original image data, a rich variety of different text message backgrounds can be derived. Using header 82A of the theme file 68, it can be determined which original image data are included in the theme file 68. Moreover, header 82A can show whether or not the original image datum includes a predetermined text display area and the corresponding positions of the text display areas if the image data have predetermined text display areas. The present invention is able to perform text message display using a comic book style. Using the original data sets indicated in the header 82A without predetermined text display areas, the present invention performs text message display with a movie subtitle style. In practical implementations of the present invention, the header 82A of each theme file 68 can be limited to a particular data length (for example 4096 bytes). In this way, it is convenient for the analysis module 74 to obtain the relative position of the original data 84 in the body 82B for decoding.

According to the present invention, different backgrounds can have different size of text display areas. A situation may therefore occur where a long text message having too many characters to fit in a particular text display area is received. In this situation, different sections of the long text message can be displayed in different background images with text display areas until all the content of that long text message is displayed.

Figure 8:
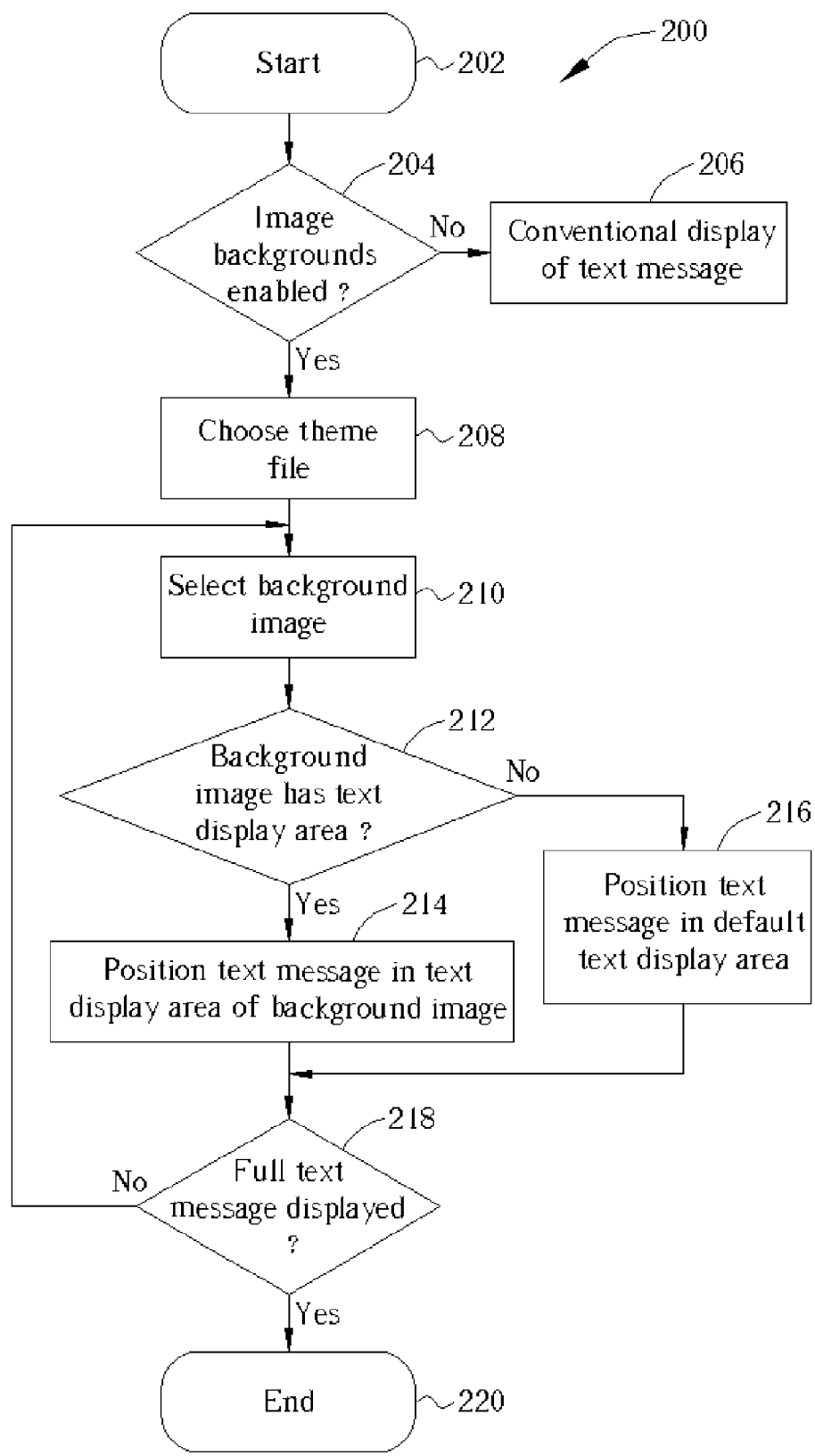
FIG. 8 shows an operational flowchart describing the detailed operation of using different background images to pair with text messages and display combined image data according to an exemplary embodiment of the present invention.

Please refer to FIG. 8. FIG. 8 shows an operational flowchart 200 describing the detailed operation of using different backgrounds to pair with text messages and display combined image data according to an exemplary embodiment of the present invention. Flowchart 200 forms a control procedure for the mobile phone 40 and includes the following steps:

Step 202: Start background image and text message combining operations. When receiving a text message, the user can control the mobile phone 40 to begin executing flowchart 200 to pair the text message content with different background images. Alternatively, the user can first store the text message content in the storage device 56 of FIG. 2, and then at a later time control the mobile phone 40 to execute flowchart 200 to use the text display method according to the present invention to read the text message. Regardless of which choice, at step 202, the text message the user desires to read is stored in the memory 54.

Step 204: Check if the present invention is desired to view the text message. The user uses the previously mentioned user interface 52 to configure whether or not image backgrounds are to be paired with text message content prior to executing flowchart 200. If the user has previously selected to use background images with text messages, proceed to step 208. Otherwise, if the user has previously selected not to use background images with text messages, proceed to step 206. Of course, optionally, the mobile phone 40 can be set to ask whether the user wishes to display background images with text messages each time a text message is displayed. According to the user's response, the mobile phone 40 then proceeds to either step 206 or 208.

Step 206: Use conventional methods (no background image) to display the text message data 90 on the display panel 42.

Step 208: If the user has selected to use image backgrounds with text messages, this step can be executed. Choose a particular theme file 68S (refer to FIG. 2) according to the settings module 72 and the user's predetermined selection in step 204. The analysis module 74 decodes the header 62A of the selected theme file 68S to determine how many original image data for different background images are stored in the selected theme file 68S, and to determine whether or not each original image datum has a predetermined text display area. As mentioned early, in one embodiment of the present invention, the particular theme file is selected according to a user setting. In another embodiment, the mobile phone 40 determines the particular theme file by searching key words in the text message. In order to be compatible with this embodiment, the header of each theme file must first also include at least one key word (i.e., before executing flowchart 200). When the user wants to execute flowchart 200 to read a particular text message, the settings module 72 checks the particular text message to determine if it includes a key word corresponding to one of the theme files. If the particular text message does not include a key word, the settings module 72 selects a theme file according to the user's predetermined setting. However, if the particular text message does includes a key word matching one of the theme files, the settings module 72 uses the matching theme file as the selected theme file 68S for the remaining steps.

For example, a first theme file could have a key word such as "happy", while a second theme file could have a key word such as "sad". When the user wants to display a text message, the settings module 72 checks the text message for the key words associated with the theme files. If a key word is found, the corresponding theme file is selected. In this way, the present invention increases user enjoyment when displaying text messages.

Regardless of the implementation of the above-mentioned embodiments, when flowchart 200 has finished this step, the settings module 72 has selected a particular theme file as the selected theme file 68S. In the remaining steps, the present invention uses one of the original data stored in the particular theme file 68S as the background image for the text message.

Step 210: Select an image datum to act as the background image from the particular theme file chosen in step 208. In one embodiment of the present invention, the selecting device 76 makes a random selection to choose one of the image data from the particular theme file 68S chosen in step 208. In this way, the background image will be randomly paired with the text message. There is therefore an element of surprise, which increases user enjoyment when viewing text messages. Of course, the selecting device 76 could also follow a predetermined order when selecting one of the original image data from the particular theme file. For example, if the selected theme file 68S has four original image data stored therein, the selecting module 76 can take the order of the original image data as the display order of the background images. If the selecting module 76 has previously executed this step and selected the second image to be the background image, when executing this step for the next time, the selecting module 76 uses the third image as the background image. The remaining background images are selected using the same order. It should also be noted that choosing a specific selection method (either the random method or a predetermined order) for the selection unit 76 could also be configurable as a user setting.

Step 212: After a background image is selected from the selected theme file 68S, the selecting module 76 determines if the selected background image has a predetermined text display area. As shown in FIG. 3 and explained in the above mentioned description, according to a text display area, either a movie subtitle style (background image having no predetermined text display area) or a comic book dialog style (background image having a predetermined text display area) is used to display the text message content. If the selecting device 76 at step 210 selects a background image that already has a predetermined text display area, which means this background image will use comic book style, proceed to step 214. Otherwise, if the header of the theme file 68S does not specify a predetermined text display area, which means this background image will use movie subtitle style, proceed to step 216. Also during this step, the graphic module 78 can receive the original image datum outputted by the selecting module 76 and perform processing operations (such as decompression) to generate the image datum 86 for storage in memory 54 as shown in FIG. 2. After this step, the image datum 86 corresponding to the selected background image is stored in the memory 54.

Step 214: Comic book style text message display. Position characters of the text message 90 in the predetermined text display area of the selected background image 86 using the combining module 80. In this way, the user is able to see the paired background image and the text message together on the display panel 42. Of course, if the length of the text message is longer than the predetermined space in the text display area, a portion of the characters of the text message corresponding to the size of the predetermined text display area will be display first.

Step 216: Movie subtitle style text message display. Position the characters of the text message 90 in a default position of the display using the combining module 80. Characters of the text message 90 are pasted onto the image datum 86 in the default position to form combined data displayed on the display panel 42. Similar to step 214, if the length of the text message is longer than the predetermined space in the default position, the combining module 80 will first combine the image datum with a portion of the characters of the text message corresponding to the size of the predetermined text display area.

Step 218: Check whether or not the full text message has been displayed. If there are still characters in the text message that have not been displayed, return to step 210 to continue processing steps 210, 212, and 214 or 216. The remaining characters in the text message will therefore be displayed with another background image. Otherwise, if the full text message has already been displayed, proceed to step 220.

Step 220: Text message display finished.

Figure 9:
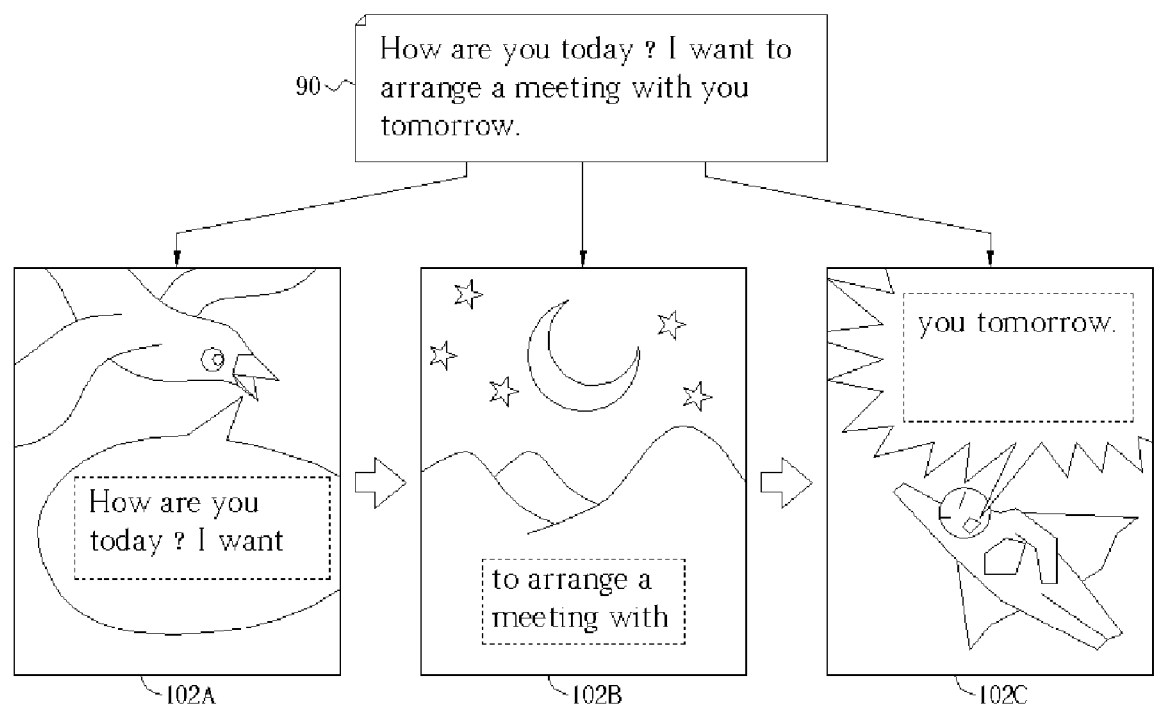
FIG. 9 is a diagram showing how three sets of combined data will be displayed on the display panel of the mobile phone of FIG. 2 for a long text message.

As can be seen from the above description of flowchart 200, when using the present invention to display a long text message, the long text message may have some sections displayed using a layout similar to comic book style dialog boxes and some sections displayed using a layout similar to movie style subtitles. Concerning this situation, please refer to FIG. 9. FIG. 9 shows how three sets of combined data will be displayed on the display panel 42 of mobile phone 40 for a long text message. As an example, in FIG. 9, the long text message is "How are you today? I want to arrange a meeting with you tomorrow." The selecting module 76, following flowchart 200, might use random selection to selection background images 94B, 94D, and 94A to respectively display the three sections of the long text message. The resulting sets of combined data displayed on the display panel are shown in FIG. 19 as 102A, 102B, and 102C, respectively. According to the present invention, these changing background images both increase the user's enjoyment of reading text messages as well as give the mobile phone 40 a more friendly user interface.

Briefly, by using a series of image frames and associated information such as the predetermined text display areas stored in each theme file, the present invention is able to actively control pairing of background images with text message content. In practical implementations, a plurality of theme files can be pre-stored at the time of mobile phone manufacture. Alternatively, the mobile phone manufacturer can provide theme files available to users for wireless download through the wireless network. Additionally, each manufacturer and communications business can provide different theme files available for download on the Internet. The user can use a personal computer connected to the Internet to download theme files. Afterwards, the personal computer can be used to transfer the theme files to the mobile phone. For example, using USB, Firewire, or Bluetooth. In another embodiment, the mobile phone can directly receive the theme files from the communication network by using Wireless Application Protocol (WAP) to directly surf the Internet through the wireless communication network. Using these methods, the user has access to large variety of image backgrounds.

Figure 10:
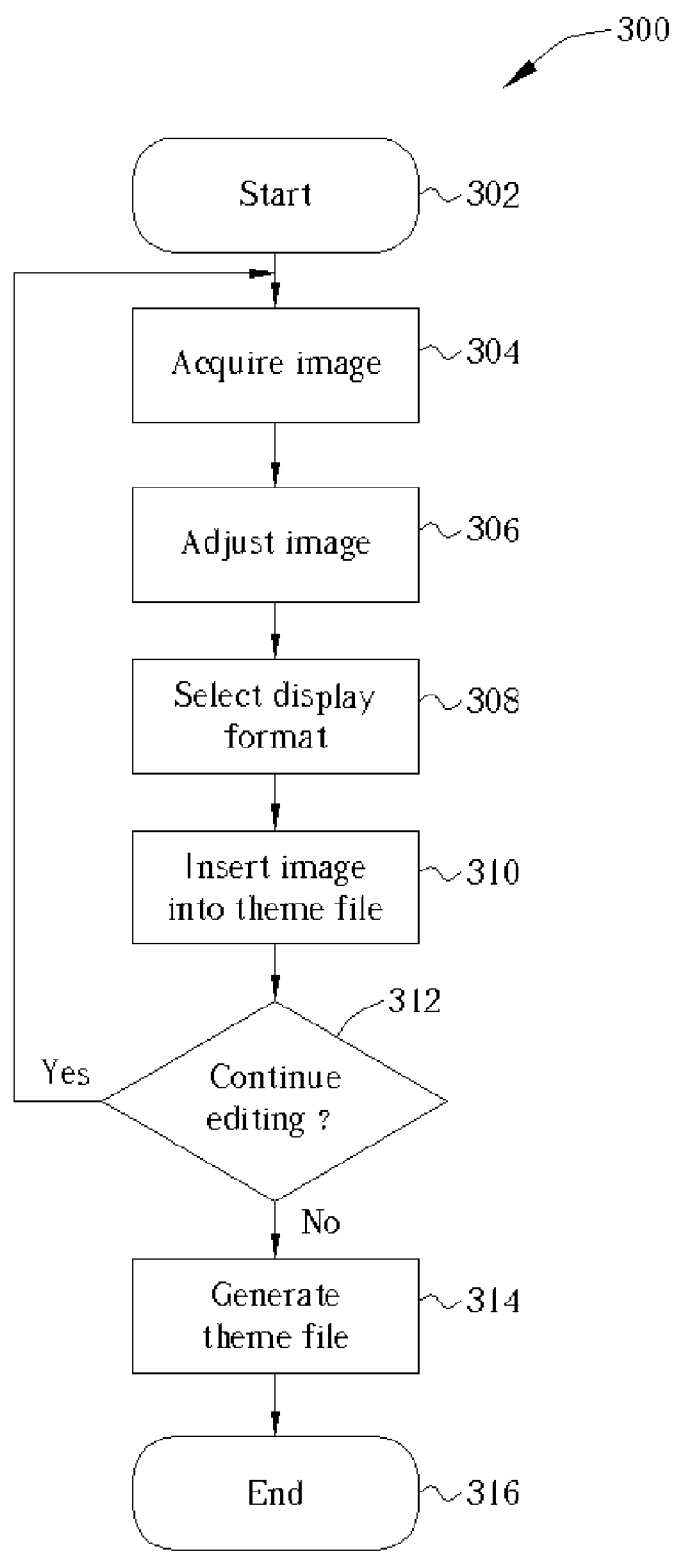
FIG. 10 is a flowchart describing a method of image editing for helping a user create theme files according to the present invention.

Of course, according to the present invention, in order to enable the mobile phone user to have complete control of the style of their mobile phone, the mobile phone manufacturer can also choose to provide appropriate image editing software. The image editing software is used to allow the user to perform image editing, to organize the various theme files, and to thereby determine which background images will be used. The user can execute the image editing software on a personal computer to design theme files and to transfer the theme files between the personal computer and the mobile phone. In order to meet the above-mentioned goals, the image editing software should help the user create theme files. Please refer to FIG. 10. FIG. 10 shows a flowchart 300 describing a method of image editing for helping the user create theme files according to the present invention. Flowchart 300 includes the following steps:

Step 302: Start. When the user starts the image editing software on a computer, the image editing software begins execution at step 302.

Step 304: Acquire an image file. The user uses the image editing software to select a desired image file.

Step 306: Adjust the image file format and pixel dimensions. The editing software should use the user's image file selected in step 304 to perform an appropriate image resize operation and file format conversion. For example, the editing software can convert a .BMP type image file to a .JPG type image file. The image file should be converted to a file format and size appropriate for being displayed on the mobile phone.

Step 308: Regarding the image file selected in step 304, the user can decide whether to use a comic book style or a move subtitle style when displaying text messages with the image file. If comic book style is selected, the user uses the image editing software to specify the predetermined text display area. Of course, in practical implementations, a preferred embodiment is to us an input system such as a mouse and a "what you see is what you get" (WYSIWYG) style display to allow the user to directly and easily configure the text display area. If the background image being created from the image file is to use movie subtitle style to display text messages, the editing software should display the default text display area on the image frame. In order to clearly see the displayed text message content, the user can use the image editing software to position the text message display area in a clear area where the color and graphic in the image file will not interfere with the readability of text message content.

Step 310: Once the above step is completed, the user uses the image editing software to select a theme file to insert the created image. According to a preferred embodiment of the present invention, the user uses the image editing software to create a "compilation file". Each "compilation file" corresponds to a theme file, and is used to gather a series of image files for use when displaying text messages. After executing steps 304 to 308, the user can take the processed image file and add it into a particular "compilation file". This is equivalent to the above-mentioned process of inserting an image file into a theme file to become one of the available background images. Of course, if the user wants to move or remove a certain image graphic from a certain theme file to prevent it from being used as a background image, the user can move or delete the image graphic from the "compilation file" corresponding to the theme file.

Step 312: If the user still wants to continue adding new image files to the current theme file, the image editing software returns to step 304. Otherwise, the image editing software proceeds to step 314.

Step 314: According to the "compilation file", generate a corresponding theme file. The image editing software performs appropriate processing such as compression to the series of image files selected by the user to form the theme file body. The text message area information chosen by the user and other information is used to form the theme file header. Finally, the theme file body and theme file header are combined to generate the theme file.

Step 316: Finished. After finishing creation of the theme file, execution of the flowchart 300 is ended. Afterwards, the user is able to use the personal computer to transfer the user's newly created theme file to the mobile phone. The mobile phone is thereby enabled to use different image backgrounds to pair with incoming text messages for display according to the present invention.

In addition to the above-disclosed functions, the image editing software can also open, browse, edit, and manage already created theme files. That is, the image editing software can open an existing theme file, allow the user to browse the different background images stored in the theme file, and determine various information and parameters according to the background image. For example, each image size, name, whether or not the image has a predetermined text display area, etc. The user is also able to add image files to already created theme files, delete unwanted image files from theme files, and alter settings of images by such adjustments as modifying the predetermined text display area or selecting whether to comic book style or movie subtitle style text message display. Afterwards, the image editing software then generates a modified theme file body and header according to the user modifications and combines them to form a modified theme file.

The image editing software can also have additional functions. For example, the image editing software can validate a theme file to determine whether or not it complies with the correct format. That is, whether or not it has an appropriate header and body. As mentioned above, the user can download different theme files; however, during the downloading process it is possible that errors can occur due to network problems. In these situations, the downloaded theme file may have errors or be incomplete. The image editing software analyzes the header and the body of the theme file to determine whether or not they are of the correct format and whether or not errors exist. This helps the user to check wither a certain theme file can be correctly used with the present invention mobile phone for text message display. The image editing software can also simulate text message display by displaying a predetermined text message as a received text message. The simulation can be used to test the suitability of a particular background image and allow the user to approximately determine what a particular background image and text display area will look like on the mobile phone. Furthermore, the image editing software can also provide corresponding information to assist the user in defining a correct format of the theme file. For example, different mobile phones having different model numbers may have different pixel resolutions for their respective display areas. The file format of the theme file or the correct display format of image graphics may also be different between models. The image editing software can have preset formats for different mobile phone model numbers. In this way, the user is able to use the image editing software to generate or check a theme file according to an appropriate mobile phone model number. Additionally, if the mobile phone supports the above-described image editing software, the user can directly execute the image editing flowchart 300 on the mobile phone itself to generate and modify theme files within the mobile phone.

The present invention provides a wireless communications device capable of displaying a selected background image and a portion of a text message together on a display panel of the wireless communications device. Characters of the text message are positioned in a predetermined text display area of the selected background image. While displaying text messages, the changing of background images increases the user's enjoyment, makes the user interface appear more friendly and interesting, and further gives the user more selection over their personal preferences. The text message display module 70 shown in FIG. 2 can be implemented using software, firmware, or hardware. For example, the text message display module 70 could be combined with a control module (not shown) or other functions and then fabricated as an integrated circuit (IC).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communications device comprising:
   a communication circuit for receiving a message signal having a text message via radio transmission;
   a storage device having a plurality of image data stored therein;
   a selecting module for selecting an image datum from the plurality of image data;
   a combining module for combining the selected image datum with the text message to generate combined data, wherein if the selected image datum indicates a predefined text display area, the combining module positions the text message in the predefined text display area of the selected image datum; and
   a display panel for displaying the combined data;
   wherein if the selected image datum does not indicate a predefined text display area, the combining module positions the text message in a default position of the display of the wireless communications device.

2. The wireless communications device of claim 1, wherein if the selected image datum indicates a predefined text display area, the combining module is for pasting text of the text message on the image within the predefined text display area of the selected image datum.

3. The wireless communications device of claim 1, wherein the selecting module randomly selects the image datum from the plurality of image data.

4. The wireless communications device of claim 1, wherein if the text message is longer than a predetermined number of text characters, the combining module combines the selected image datum with the predetermined number of text characters of the text message to generate the combined data.

5. The wireless communications device of claim 4, wherein the predetermined number of text characters is equal to a maximum number of text characters displayed in the predetermined text display area of the selected image datum.

6. The wireless communications device of claim 4, wherein the selecting module further selects a second image datum from the plurality of image data, and the combining module further combines the second selected image datum with remaining number of text characters of the text message to generate second combined data.

7. The wireless communications device of claim 1, wherein the storage device has at least one theme file stored therein, each theme file includes at least one image datum, and the wireless communications device further comprises:
   a settings module for selecting a theme file from the theme files stored in the storage device;
   wherein the selecting module selects the selected image datum from the selected theme file.

8. The wireless communication device of claim 7, wherein the theme file has a header for storing parameters for each image datum stored in the theme file; and the wireless communication device further comprises:

an analysis module for reading the parameters stored in the selected theme file, and the selecting module selects the selected image datum according to the parameters.

9. The wireless communication device of claim 8, wherein the parameters comprise the number of image data stored in the theme file.

10. The wireless communication device of claim 8, wherein the parameters comprise starting addresses for each image datum within the theme file.

11. The wireless communication device of claim 7, wherein each theme file has a corresponding list of key words, and the settings module searches lists of key words in the text message;
wherein if the text message contains a particular key word, the settings module selects the theme file corresponding to the particular key word.

12. A method of displaying a text message on a wireless communications device, the method comprising:
storing a plurality of image data;
receiving a message signal having the text message via radio transmission;
selecting an image datum from the plurality of image data;
combining the selected image datum with the text message to generate combined data, wherein if the selected image datum indicates a predefined text display area, positioning the text message in the predefined text display area of the selected image datum; and
displaying the combined data on a display panel of the wireless communications device;
wherein if the selected image datum does not indicate a predefined text display area, positioning the text message in a default position of the display of the wireless communications device.

13. The method of claim 12, further comprising randomly selecting the image datum from the plurality of image data.

14. The method of claim 12, wherein if the text message is longer than a predetermined number of text characters, combining the selected image datum with the predetermined number of text characters of the text message to generate the combined data.

15. The method of claim 14, wherein the predetermined number of text characters is equal to a maximum number of text characters displayed in the predetermined text display area of the selected image datum.

16. The method of claim 14, wherein if the text message is longer than the predetermined number of text characters, the method further comprises:
selecting a second image datum from the plurality of image data, and
combining the second selected image datum with remaining number of text characters of the text message to generate second combined data.

17. The method of claim 12, wherein the storage device has at least one theme file stored therein, each theme file includes at least one image datum, and the method further comprises:
selecting a theme file from the theme files stored in the storage device; and
selecting the image datum from the selected theme file.

18. The method of claim 17, wherein the theme file has a header for storing parameters for each image datum stored in the theme file; and the method further comprises:
reading the parameters stored in the selected theme file; and
selecting the selected image datum according to the parameters.

19. The method of claim 17, wherein each theme file has a corresponding list of key words, and the method further comprises:
searching for keywords in the text message; and
selecting the theme file corresponding to a particular key word as the selected theme file if the text message contains the particular key word.

20. A wireless communications device comprising:
a communication circuit for receiving a message signal having a text message via radio transmission;
a storage device having a plurality of image data stored therein;
a selecting module for selecting an image datum from the plurality of image data;
a combining module for combining the selected image datum with the text message to generate combined data, wherein if the selected image datum indicates a predefined text display area, the combining module positions the text message in the predefined text display area of the selected image datum; and
a display panel for displaying the combined data;
wherein if the text message is longer than a predetermined number of text characters, the combining module combines the selected image datum with the predetermined number of text characters of the text message to generate the combined data, and the selecting module further selects a second image datum from the plurality of image data, and the combining module further combines the second selected image datum with remaining number of text characters of the text message to generate second combined data.

21. The wireless communications device of claim 20, wherein if the selected image datum does not indicate a predefined text display area, the combining module positions the text message in a default position of the display of the wireless communications device.

22. A wireless communications device comprising:
a communication circuit for receiving a message signal having a text message via radio transmission;
a storage device having a plurality of image data stored therein;
a selecting module for selecting an image datum from the plurality of image data;
a combining module for combining the selected image datum with the text message to generate combined data, wherein if the selected image datum indicates a predefined text display area, the combining module positions the text message in the predefined text display area of the selected image datum; and
a display panel for displaying the combined data;
wherein the storage device has at least one theme file stored therein, each theme file includes at least one image datum, and the wireless communications device further comprises a settings module for selecting a theme file from the theme files stored in the storage device;
the selecting module selects the selected image datum from the selected theme file;
each theme file has a corresponding list of key words, and the settings module searches lists of key words in the text message; and
if the text message contains a particular key word, the settings module selects the theme file corresponding to the particular key word.

23. The wireless communications device of claim 22, wherein if the selected image datum does not indicate a predefined text display area, the combining module positions the text message in a default position of the display of the wireless communications device.

24. A method of displaying a text message on a wireless communications device, the method comprising:
   storing a plurality of image data;
   receiving a message signal having the text message via radio transmission;
   selecting an image datum from the plurality of image data;
   combining the selected image datum with the text message to generate combined data, wherein if the selected image datum indicates a predefined text display area, positioning the text message in the predefined text display area of the selected image datum; and
   displaying the combined data on a display panel of the wireless communications device;
   wherein if the text message is longer than a predetermined number of text characters, combining the selected image datum with the predetermined number of text characters of the text message to generate the combined data, selecting a second image datum from the plurality of image data, and combining the second selected image datum with remaining number of text characters of the text message to generate second combined data.

25. The method of claim 24, wherein if the selected image datum does not indicate a predefined text display area, the combining module positions the text message in a default position of the display of the wireless communications device.

26. A method of displaying a text message on a wireless communications device, the method comprising:
   storing a plurality of image data;
   receiving a message signal having the text message via radio transmission;
   selecting an image datum from the plurality of image data;
   combining the selected image datum with the text message to generate combined data, wherein if the selected image datum indicates a predefined text display area, positioning the text message in the predefined text display area of the selected image datum; and
   displaying the combined data on a display panel of the wireless communications device;
   wherein the storage device has at least one theme file stored therein, each theme file includes at least one image datum, and the method further comprises:
      selecting a theme file from the theme files stored in the storage device; and
      selecting the image datum from the selected theme file; and
   wherein each theme file has a corresponding list of key words, and the method further comprises:
      searching for key words in the text message; and
      selecting the theme file corresponding to a particular key word as the selected theme file if the text message contains the particular key word.

27. The method of claim 26, wherein if the selected image datum does not indicate a predefined text display area, the combining module positions the text message in a default position of the display of the wireless communications device.

* * * * *